United States Patent [19]

Kerzner

[11] Patent Number: 4,541,275

[45] Date of Patent: Sep. 17, 1985

[54] LOG CORRELATION METHOD AND APPARATUS

[75] Inventor: Mark G. Kerzner, Houston, Tex.

[73] Assignee: Dresser Industries, Inc., Dallas, Tex.

[21] Appl. No.: 533,178

[22] Filed: Sep. 19, 1983

[51] Int. Cl.$^4$ ............................................. E21B 47/00
[52] U.S. Cl. ....................................... 73/152; 364/422
[58] Field of Search ......................... 73/152; 364/422; 367/25; 324/351, 355, 357, 366, 367, 371

[56] References Cited

U.S. PATENT DOCUMENTS

| | | | |
|---|---|---|---|
| 4,303,975 | 12/1981 | Hepp | 364/422 |
| 4,316,250 | 12/1982 | Vincent | 364/422 |
| 4,320,458 | 3/1982 | Vincent | 364/422 |
| 4,320,469 | 3/1982 | Frawley et al. | 364/422 X |
| 4,334,271 | 6/1982 | Clavier | 364/422 |
| 4,348,748 | 9/1982 | Clavier et al. | 367/25 |
| 4,357,660 | 11/1982 | Hepp | 464/422 |
| 4,414,656 | 11/1982 | Hepp | 367/25 |

OTHER PUBLICATIONS

"An Approach to Detailed Dip Determination Using Correlation by Pattern Recognition", Vincent et al., Journal of Petroleum Technology, pp. 232-240, 2/1979.
"An Analytical Approach to Detailed Determination Using Frequency Analysis", M. G. Kerzner, 23rd Annual SPWLA Logging Symposium, Paper J, 7/1982.
"An Algorithm for Automatic Dip Computation", F. Kemp, Computers & Geosciences, vol. 6, pp. 193-209, 1980.
"Computer Methods of Dip Correlation", Schoonover and Holt, SPE 3566 revised, 2/1973.
"Automatic Computation of Dipmeter Logs Digitally Recorded on Magnetic Tapes", Moran et al., SPE, 8/1961.

*Primary Examiner*—Jerry W. Myracle
*Attorney, Agent, or Firm*—Patrick H. McCollum; Richard M. Byron

[57] ABSTRACT

An improved method and apparatus for correlating logging curves particularly adapted to formation dip determination from wire line dip meter measurements. A plurality of data sets each having a corresponding formation resistivity logging curve associated therewith are generated from a borehole. An activity transform function is derived from each data set, the maxima above a predetermined noise level of which are utilized to determine a set of possible points on the respective logging curve for correlation with points on another such curve. The set of points is reduced in size according to criteria requiring all possible correlated point-pairs to be separated in depth by no more than a predetermined maximum search interval, and on respective curve segments having the same slope sign and shape, wherein the shape criterion is a function of the activity. Final optimally correlated point-to-point matches or point-pairs are then selected through dynamic programming optimization using a spring loaded template matching approach.

20 Claims, 7 Drawing Figures

FIG. 1

PAD TRACES    FIG. 2A    ACTIVITY FUNCTION

PAD TRACES    FIG. 2B    ACTIVITY FUNCTION

LOG CORRELATION METHOD AND APPARATUS

BACKGROUND OF THE INVENTION

This invention relates generally to improved methods and apparatus for investigating subsurface earth formations traversed by a borehole, and more particularly to an improved technique for processing formation measurements to obtain displacements between measurements for use in correlating logs.

It is often desirable to correlate or compare curve shapes of two or more well logging curves which have been generated either during the same or different traversals of the logging instrument through the same borehole or, alternatively, during traversals through adjacent boreholes to locate corresponding data points on the curves.

One example of the reason for this may be to check or compare a re-logging of a well against a prior log of the same or different parameters to insure that all measurements are on depth. Another example might be in field studies where well-to-well depth correlations are desired. Yet another example might be in the case of formation dip measurements wherein a plurality of measurements are made during one borehole pass.

In the latter case, a logging instrument is provided having four movable arms spaced ninety degrees apart in azimuth, each having a pad in contact with the borehole wall which carries an electrode system for making a shallow focused formation resistivity measurement.

Normally, the shapes of each logging curve measurement thus generated by the pads are similar since they are measuring characteristics of portions of the formation relatively adjacent one another.

However, due to such things as the logging sonde not always being oriented perpendicular to formation beds (for example because the beds are inclined relative to the sonde), although the shapes of each measurement may appear similar, they may appear offset in depth. This is because one of the measuring pads will reach the bed and thus generate a characteristic signature prior to another pad.

As is well known in the art, the amount of such offsets in the pad signals relative to one another provides valuable information about the amount and direction of formation dip. Thus, once again it is necessary to find ways to compare or correlate the logging curve shapes to determine the offsets.

Several methods have been attempted over the years to correlate two or more logging curves. The oldest method was simply optical correlation by an experienced individual whereby visual comparisons were simply made between portions of the logs. While this method was often very reliable, it was obviously extremely time consuming, particularly if high resolution was desired or large depth intervals were involved, and moreover, the method further depended upon the subjective human abilities of the particular analyst.

Another group of methods known as "fixed interval correlation" utilized a statistically defined cross-correlation coefficient in comparing successive intervals of finite length on two measurement curves as a measure of curve similarity.

Fixed interval correlation has also evidenced several difficiencies in log analysis applications including insufficient depth resolution and computational inefficiency inasmuch as a large number of computations was required. The method was also particularly unsuited to formation dip measurements exhibiting unreliability in complicated stratification, for example, and loss of dip variations when smaller than the correlating interval.

Moreover, this correlation interval was preset and thus not adapted continuously to the current geological context, causing missed correlations and limitations on resolutions. Still further, because the dip calculations were attributed to an interval and not to the bedding, only bulk directional properties over each particular interval were described rather than the basic cause of correlation, e.g., bedding. Thus, true correlations were often missed or high cross-correlation coeffients were noted for curve features which did not correlate.

Still another log correlation method commonly referred to as "point-to-point" correlation has been attempted. In this method, pattern recognition or classificiation is employed whereby pattern vectors of each curve to be correlated are analyzed against a "catalog" of standard patterns.

However, although improvement in depth resolution may have been noted, this method too has been found deficient particularly with formation dip applications in its noise susceptibility, e.g., failure to distinguish between regular and random features in data which result in excessive scatter and gaps in formation dip determinations.

Accordingly, the present invention overcomes these and other deficiencies of the prior art by providing an improved method and apparatus for utilizing statistical and frequency distribution of the measurement data to determine well log correlations.

SUMMARY OF THE INVENTION

A plurality of well logging curves to be correlated are generated, each over a respective borehole interval. The data for each curve is pre-processed in accordance with an algorithm whereby, for each curve, an activity function is derived and a corresponding activity curve of the following form as herein defined:

$$A(d) = K \times \sum_{i=-N/2}^{i=+N/2} [r(i + d) - \bar{r}(d)]^2 \quad \text{Equation 1}$$

An activity function noise level cutoff is empirically determined and all maxima above the cutoff on each activity function are identified and matched to depth-correlative data points on the corresponding logging curve from which the respective activity function was derived.

All possible pairs of such data points meeting predetermined conditions are then identified, wherein each data point of each pair corresponds to a different logging curve, and wherein each such pair simultaneously satisfies the constraints that: the difference in depth at which each point of the pair was generated does not exceed a predetermined maximum; the points of each pair are either both on the positively sloping portions or both on the negatively sloping portions of their respective corresponding logging curves; and the shapes of the corresponding sloping portions of the logging curves including the points of each pair must be "similar" as defined by a predetermined function of the activity function values corresponding to the sloping portions and having the herein defined form of $A_1/A_2 \leq F$, $A_2/A_1 \leq F$.

Once all possible pairs of data points meeting the above-noted conditions are matched for all two-curve combinations, for each pair of curves selection of optimal point-to-point correlations or pairs from the universe of all possible pairs is made by dynamic programming optimization, wherein equations of the following form and herein defined are solved:

$$\sum_i |\Delta b_i| + c \times s \rightarrow \min \quad \text{Equation 2}$$

$$b_{ij} = (x_i - y_i) - (x_j - y_j) \text{ if } y_j < y_i \text{ and} \quad \text{Equation 3}$$

$$x_i \neq x_j \infty \text{ if } y_j \geq y_i \text{ or } x_i = x_j$$

In a particular preferred embodiment of the invention, the plurality of logging curves is comprised of a plurality of micro-resistivity measurements each derived from a different respective pad of a dip meter logging tool.

It is therefore an object of the present invention to provide an improved method and apparatus for correlation of well logs.

It is another object of the present invention to provide an improved point-to-point well logging correlation method and apparatus.

It is yet a further object of the present invention to employ a transform function related to statistical and frequency distribution of logging measurements to determine well logging correlation.

Still a further object of the present invention is to provide an improved method and apparatus for detection of formation bedding plane dips.

Yet another object of the present invention is to provide an improved automated formation dip analysis method and apparatus having improved depth resolution, computational efficiency, noise immunity, and ratios of correlations to sample intervals.

These and other objects and advantages of the present invention can be understood from the following detailed description in conjunction with the drawings wherein:

DESCRIPTION OF THE PREFERRED EMBODIMENT

Figure 1:
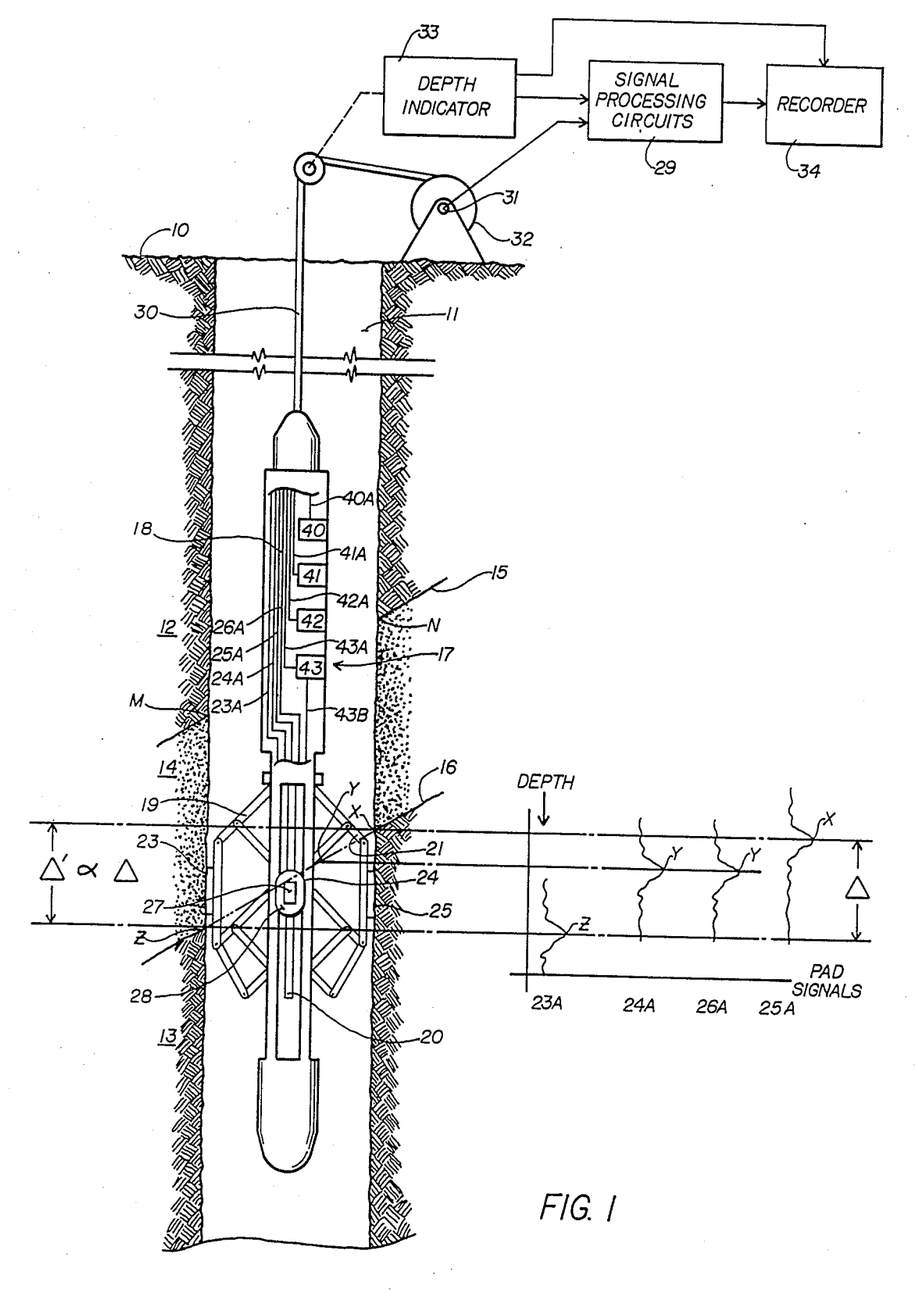
FIG. 1 is a side elevational view, partly in cross-section, of a dip meter logging system in accordance, with the present invention.

Referring now to the drawings in detail, particularly to FIG. 1, therein is illustrated schematically a typical borehole surveying operation in which a portion of the earth 10 is shown in vertical section. Well 11 penetrates the earth's surface. Typical earth formations are illustrated by shale formations 12 and 13 and intervening sand formation 14 having formation interfaces 15 and 16. Disposed within well 11 is a formation surveying instrument 17 commonly known as a dip meter tool. Dip meter tool 17 includes an elongated body member 18 having a plurality of arm members 19, 20, 21 and 22 disposed symmetrically about body member 18. Mounted on each arm member 19-22 is a corresponding probe pad 23, 24, 25 and 26 for contacting the sides of borehole 11 to obtain formation data. (In the view of FIG. 1, arm member 22 and probe pad 26 are obscured from view by body member 18, arm member 20 and probe pad 24.)

Each probe pad 23-26 includes an emitting electrode 27 for emitting currents into the surrounding earth formations. Each probe pad 23-26 also has a metal guard electrode 28 which encircles and is concentric with emitting electrode 27. Emitting electrode 27 is electronically insulated from guard electrode 28. Guard electrode 28 functions to insure that the potential difference across the entire pad remains near zero so that emitted current is focused into the formation.

The measured voltages and currents are processed by electronic circuitry (not shown) located within body member 18. Also located within body member 18 is telemetry circuitry for transferring data between tool 17 and surface processing circuitry 29. A more detailed description of various techniques associated with the measurements herein discussed can be found in the articles "The Micro Laterolog" and "The Laterolog" by H. G. Doll, published in the *Journal of Petroleum Technology* in January 1953 and November 1951, respectively, which are herein incorporated by reference.

Dip meter tool 17 is suspended in well 11 by multiconductor cable 30 which contains the required conductors for electrically connecting tool 17 with surface processing circuits 29 through slip rings 31 located on the end of drum 32. Cable 25 is wound or unwound from drum 32 in raising and lowering tool 17 to traverse well 11. As tool 17 traverses well 11 the movement of cable 30 is measured by a suitable measuring device and coupled to depth indicator 33. The depth information from depth indicator 33 is coupled to signal processing circuits 29 and recorder 34. Therefore, each sample of a measured signal corresponds to one increment in depth and displacements determined between such signals are indicative of depth displacements.

The elements of FIG. 1 are shown diagrammatically, and it is to be understood that the associated circuits and power supplies are provided in a conventional manner. It is also to be understood that the instrument housing will be constructed to withstand the pressures, mechanical, and thermal abuses encountered in logging a dip well and to provide adequate space therewithin to house the necessary apparatus to conduct the surveying operation. Further, while the tool of FIG. 1 is described as having four movable arms spaced 90 degrees apart, the present invention is not limited to any specific number of arms, or even the dip meter tool depicted herein. The dip meter tool 17 has been depicted for convenience because it simultaneously generates four resistivity logs 23A-26A whereby the curve correlating features of the present invention may be described. However, it is specifically contemplated that the correlating methods and apparatus of the present invention may be adapted to two or more other well logging curves.

On a well logging operation such as illustrated in FIG. 1, tool 17 is caused to traverse well 11. Current is emitted from emitting electrode 27 located in each probe pad 23-26. Guard electrode 28 on each respective probe pad 23-26 confines the emitted currents into the desired focused pattern. Measured survey signals indicate changes in formation characteristics adjacent each pad. The resultant survey signals are processed in subsurface electronic circuitry and transmitted through electrical conductors within cable 30, through slip rings 31, to signal processing circuits 29 for processing. It should be recognized that the signals can be processed at the well site or the signals may be transmitted by a transmission system to a remote computer location for processing. Additionally, the signals may be recorded on a suitable recording medium, such as, for example, magnetic tape for later processing.

The measurements from the dip meter tool 17 are useful in identification of faults, cross bedding, said bars, reef, channels, deformation around salt domes, and other structural anomalies, There are two basic sets of data necessary for calculating dip angle and direction. These are at least three points to establish a plane, and a system for determining the orientation of the plane with respect to vertical and true north.

Referring still to FIG. 1, a brief description will be given of how this data is derived within a borehole. Housed within body member 18 of FIG. 1 is an orientation section which continuously establishes the position of tool 17 with respect to the vertical and to magnetic north. The azimuth or direction of pad 23 is measured by a magnetic compass 40. Attached directly to compass 40 is the wiper arm of a potentiometer. Relative movement of the compass needle due to rotation of tool 17 varies the measured resistance of the potentiometer. The resistance of the potentiometer is directly related to the azimuth of the number one probe pad. A gimbal type suspension system supports the compass assembly 40, thereby allowing the compass needle to remain in a horizontal plane to permit accurate orientation measurements to be made in deviated wells. This azimuth information signal 40A is delivered uphole on cable 30.

Deviation of tool 17 from vertical is also continuously measured. Tool 17 utilizes a weighted pendulum system 41 suspended on swivel pivots and allowed to hang vertically. When tool 17 deviates from vertical pendulum 41 varies the resistance of a potentiometer. Changes in the resistance of the potentiometer are calibrated to indicate the magnitude of deivation of tool 17. Derivation signal 41A is also sent uphole on cable 30.

The direction of deviation from vertical of tool 17 is measured by pendulum system 42 which continuously aligns itself in a vertical plane passing through the well. Pendulum system 42 is connected to the wiper arm of a 360 degree potentiometer. Movement of pendulum system 42 changes the resistance of the potentiometer, indicating on a calibrated scale the angle of deviation with respect to the number one probe pad. Since the orientation of pad 23 is continuously measured as described previously, the azimuth of deviation is easily determined.

The systems described to measure tool 17 position within the well utilize low torque potentiometers. Each device is extremely sensitive to slight changes in the position of tool 17, yet is constructed to withstand the severe abuse encountered in well surveying operations. Further details as to how to obtain and use the reference measurements may be found in the article "Automatic Computation of Dipmeter Logs Digitally Recorded on Magnetic Tape" by J. H. Mercer, et al and published in the July 1962 issue of the *Journal of Petroleum Technology*, which is incorporated herein by reference.

Still referring to FIG. 1, therein are illustrated the four probe pads 23-26 of tool 17. Probe pads 23-26 are in a radially spaced apart symmetrical relationship and placed in a common plane perpendicular to the longitudinal axis of tool 17. As tool 17 traverses up the well 11, the four probe pads trace a path along the borehole wall. These pads 25, 26, 24, 23 will intersect the formation bedding plane 16 on the borehole wall respectively at the four elevational locations indicated at x, y, y and z, corresponding to probe pads 25, 26, 24, 23, respectively. As indicated, the mechanical arm assembly assures that the pad paths are located on opposite sides of the borehole for each diagonally opposing pair of pads.

The signal response for each of probe pads 23-26 is illustrated by correlation curves 23A, 24A, 25A, and 26A as the tool 17 traverses up the borehole 11. These signals from each pad 23-26 are transmitted to the surface on cable 30 as signals 23A-26A, respectively. The change in the character of correlation curves 23A, 24A, 26A, 25A, indicated by respective inflection points z, y, y and x correspond to depths at which formation bedding plane 16 intersects well 11. As illustrated, as tool 17 travels up well 11 probe pad 25 intersects formation bedding plane 16 first at x resulting in a change in the measured signal response, shown at x of correlation curve 25A. Similarly, probe pad numbers 24 and 26 next intersect formation bedding plane at y resulting in a change in the measured signal response for pads 24 and 26, shown as Y on respective correlation curves 24A and 26A.

As tool 17 continues to move upward in well 11 pad 23 intersects formation bedding plane 16 at point z, being indicated by a change in the measured signal response for pad 23, shown as Z on correlation curve 23A. It should be recognized that correlation curves 23A-26A can be used to determine displacement between the points of intersection of the formation bedding plane 16 along the wall of well 11. Thus, displacement may be determined for pads 23A and 24A or 26A using points A and Y of correlation curves 23A and 24A or 26A, for pads 23A and 25A using points Z and X of correlation curves 23A and 25A, respectively and so on.

In addition to the displacement between signal responses, the radial distance between the measure points on probe pads must be determined. The radial distances are measured independently between opposing pad pairs 23 and 25, and 24 and 26 by a borehole caliper circuit, shown at 43. This circuit transmits uphole as signal 43A the caliper measurement signal 43B from the caliper in tool 17 connected to arms 19-22. It is known that the position of any three points provide the definition of a plane penetrated by a borehole. Any two related displacements from a pad and the corresponding diameters thus define the three points and can be used to determine dip and azimuth values. A more detailed description of the determination of dip and azimuth values can be found in U.S. Pat. No. 4,303,975 by V. R. Heep which is incorporated herein by reference.

From the foregoing it will be appreciated that at least two logging data curves have been generated, and in accordance with the present invention it is now desired to compare shapes of the curves to determine displacement. For illustrative purposes and simplicity, curves 23A and 25A will be utilized having corresponding peaks z and x, respectively, which correspond to differing elevations Z and X within borehole 11 where formation bedding 16 intersects borehole 11. It will also be noted from the preceeding discussion that the elevational distance Δ between these points Z and X will be proportional to the distance Δ separating the corresponding peaks Z and X on respective pad signals 23A and 25A.

Figure 2A:
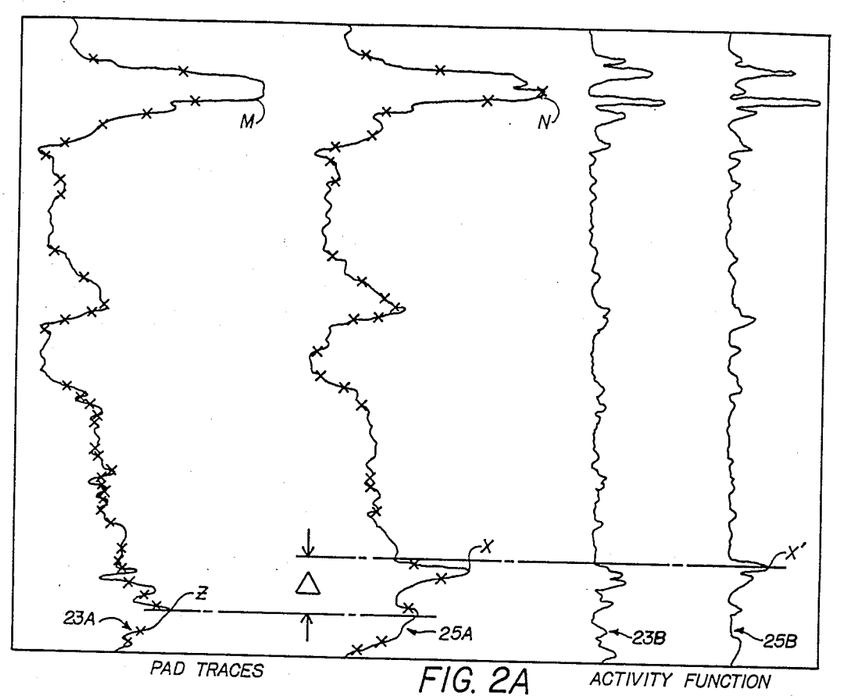
FIG. 2A depicts an illustrative pair of transform functions of the present invention and their correlative logging curves.

Referring now to FIG. 2A, there will be seen depicted therein micro-resistivity pad signals or "logging curves" 23A and 25A with corresponding peaks Z and X indicated thereon. Additionally, peaks M and N have been indicated on curves 23A and 25A corresponding to the additional bedding interface 15 of FIG. 1. The purpose for these additional peaks is to illustrate that in the depth correlation of logs there are many points which may be correlated in that the entire curve shapes will be generally similar.

It is thus desired as part of the subject invention to identify as many matched data pairs such as Z-X and M-N on respective curves such as 23A and 25A as possible. As indicated in the background of the invention these pairs will ideally thus correspond to the true correlative data points generated at the same borehole elevations in the case of two repeat logs through the same borehole. This information can then be used to make depths of the two logs correspond.

Alternatively, in the case of the dip meter measurement presently being described, the distance such as Δ between the two correlation pairs such as X minus Z is valuable information directly indicative of formation dip.

Moreover, in explaining the present invention, reference will be made to correlating only two curves for simplicity. However, particularly in view of the fact that generation of four curves has been described already, it should be readily apparent that it is contemplated that the methods to be carried out would be applicable to all combinations of curves desired to be correlated such as the four micro-resistivity curves of the dip meter measurement.

In what follows, reference will be made first to FIGS. 2A-2C for a general graphical and intuitive description and explanation of the present invention, followed thereafter by more detailed representative and illustrative flow diagrams of FIGS. 3-5 implementable by a digital computer in a conventional manner.

The method of the present invention whereby optimally correlated, matched data pairs are identified between all combinations of curves to be correlated can best be described in two stages: first the selection of all possible and feasible points on curves 23A and 25A which may be candidates for pair matchings (signifying possible depth correlation between the two points of each pair); second, the selection of the actual optimally correlated data pairs from the universe of all possible feasible pairs.

Taking first the selection of all possible pairs and still referring to FIG. 2A, at first one seemingly rational scheme for picking distinctive points on curves 23A and 25A for comparison might be the derivatives of each curve (which would indicate distinctive, unique inflection points). However, in practice the simple derivative is not suitable because it will give large values even for low amplitude noise.

Referring still to FIG. 2A, there will be seen two additional curves 23B and 25B corresponding respectively to logs 23A and 25A. Each curve is a function of its respective log and will be referred to as the "activity" function defined by:

$$A(d) = K \times \sum_{i=-N/2}^{i=+N/2} [r(i+d) - \bar{r}(d)]^2 \quad \text{Equation 4}$$

where
A(d) is the "activity" of the log signal at depth d;
r(i+d) is the logging signal at depth i+d
$\bar{r}(d)$ is the signals arithmetic average of the log over N samples at depth d, or $$\bar{r}(d) = \frac{1}{n+1} \sum_{i=-N/2}^{i=+N/2} r((i+d)$$

i+d indicates N samples at depth d, half of them higher and half of them lower at this depth; and
K is a normalization coefficient.

In the preferred embodiment N is selected to be from 7 to 11 measurement points with 9 having been found preferable in many instances. Also, with respect to dip meter measurements, it is typical to have a data sampling rate of 64 samples per foot.

The activity function, behaving as a filter or preprocessing function rather than acting upon discrete points as in the derivative, has the property that, unlike with the derivative, a smoothing effect is exhibited with low values resulting for low amplitude noise. Activity maximums may be used for characteristic log points for correlation and, in fact, will indicate characteristic points of bed boundaries on microresistivity readings. Moreover, by selecting an established noise cutoff level based upon an entire class of logs such as micro-resistivity logs, for example, activity maxima levels falling below this level, which indicate no significant information was recorded, are disregarded.

Thus, referring to FIG. 2A again, it will be seen that each activity maxima establishes a characteristic point on its corresponding original log (designated by a cross) with maxima below the noise level (not shown) being disregarded. These crosses will thus indicate all possible point-to-point matches, in accordance with the activity function criteria, on the two log curves 23A and 25A which may be correlated.

In theory, any crossed point on curve 23A could correspond to any crossed point on 25A, the total number of such corresponding matches equally the product of the number of crosses on each curve. Intuitively, it will be noted that it is necessary to apply some criteria in addition to the activity function to reduce this total number of characteristic points to a more manageable portion implementable efficiently on a computer for picking final correlation point pairs.

Fortunately, three such constraints exist to reduce the number of possible matches considerably. The first of these is that the difference in the depths at which two correlation points on two curves were derived must not be greater than a given maximum for the given logs. This constraint corresponds physically to the fact that there will be a maximum expected separation in borehole elevation such as Δ of FIG. 1 between two correlating points which may be the maximum expected dip angle in the area and referred to as the search limit.

The second criteria is that for a point on each of two curves to be considered a potentially correlated pair, both points must lie on respective curve segments having the same slope and sign, e.g., either positive or negative.

The third criteria is that for a point in each of two curves to still be considered a potentially correlating pair, the curve segments on which each point lie must have a similar "shape" to be hereinafter defined.

Figure 2B:
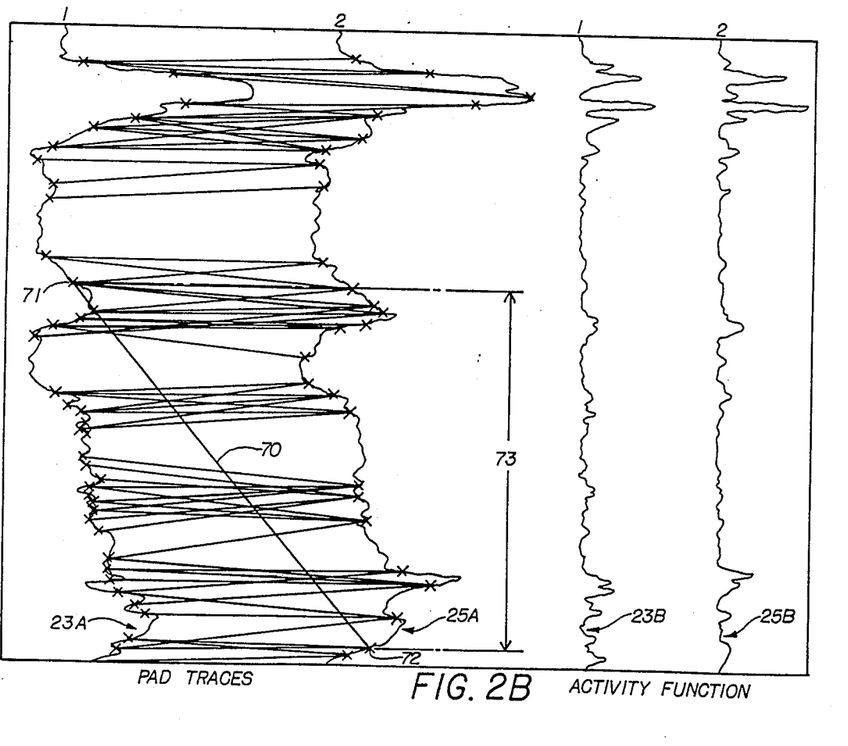
FIG. 2B is a schematic depiction of an illustrative set of maximum possible pairs of similar features.

Referring now to FIG. 2B, the significance of the preceding criteria may be seen graphically. Depicted therein are the curves 23A, B, and 25A, B of FIG. 2A, with all potentially correlating crossed point-pairs on curves 23A and 25A which meet the foregoing criteria being interconnected by a straight line.

Referring to points 71 and 72 for the moment, it can be seen, for example, why line 70 (which was drawn in only for illustrative purposes) might not properly appear due to the criteria.

First, in accordance with the first criteria, the vertical distance represented by line 73 may exceed the corresponding maximum expected dip angle in the area where the two logs 23A and 25A were derived.

Next, in accordance with the second criteria, it will be noted that points 71 and 72 lie on portions of curves 23A and 25A, respectively, having different slopes, violating this criteria.

In accordance with the third criteria, the points 71 and 72 are not situated on slopes of curves having similar shapes and thus, even intuitively, should not be candidates for a match. It should be noted that if any one of the above criteria is not met with respect to a potential point pair, the pair is rejected and not shown interconnected with the line. Thus, it will be appreciated that a significant reduction is possible in the number of potential matches from the total of AxB (wherein A and B are the number of crossed points respectively in curves 23A and 25A) to a number which, in the case of dip meter logs, for example, is often found to be in practice a reduction by a factor of 1/10.

With reference to the third criteria, further detail is required. Whereas the first two criteria are numerically definable, the third, at least initially, does not appear so in that the criteria requires a seemingly subjective condition, e.g., "similarity" of two slope segments containing the matched pair candidate. However, it has been found that each slope within the vicinity of the respective candidate-point has primarily only steepness (or "gradient") and width. Since the slope characteristics are adequately represented by the activity function (which is a function of gradient and width), the activity function at these points may be used to express the third criteria of "shape" numerically. Thus, two slopes in the vicinity of two corresponding selected points on two corresponding curves are "similar in shape" if their respective activity function values do not differ by more than a predetermined amount, or:

$A_1/A_2 \geq F$ $A_2/A_1 \geq F$ where F is a parameter predetermined for each class of logs which controls maximum allowable curve dissimilarity and is found to be four in the case of diplogs; and wherein A1, A2 are activity values for the selected points being tested on the first and second slopes.

Figure 2C:
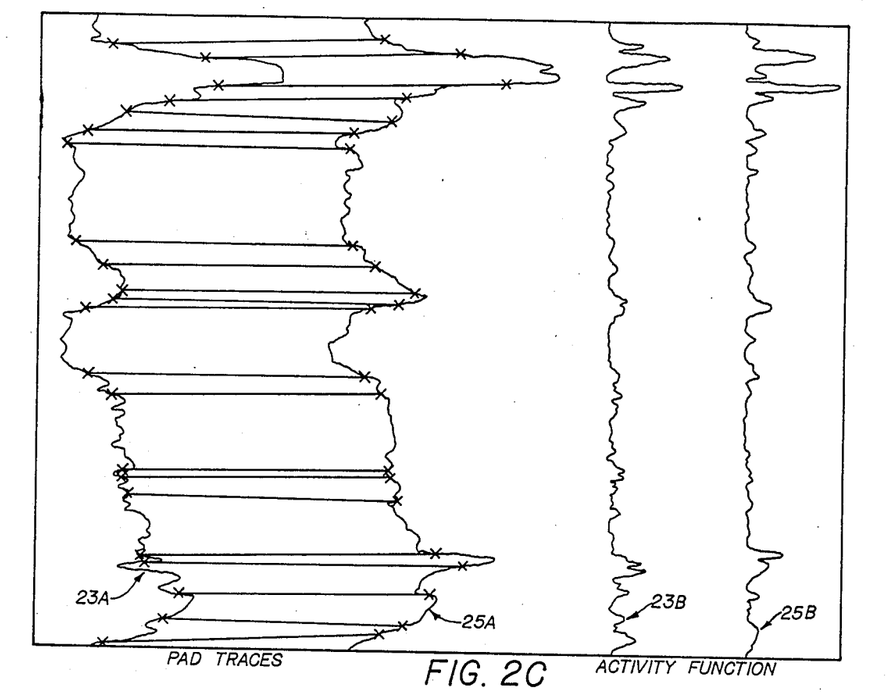
FIG. 2C is a schematic depiction of an illustrative set of optimal correlation pairs selected from the maximum possible pairs depicted in FIG. 2B.

Once, as indicated in FIG. 2B, all possible paired point-to-point matches are selected by derivation and application of the activity functions, and then (in accordance with the three criteria reduced) the number of possible correlation pair-points is reduced, the second stage of the present invention is then applied wherein the final selection of the actual optimally correlated paired-points is made as shown in FIG. 2C.

Thus, referring now to FIG. 2C in comparison to FIG. 2B, several things may be noted. First, FIG. 2C is a graphical representation of the actual point pairs (selected from the universe of possibly correlating pairs depicted in FIG. 2B) which have been optimally correlated in accordance with the method of the present invention depicted in the flow diagram of FIG. 5. Each such pair is interconnected by a line which has a counterpart line in FIG. 2B.

It can be seen that the number of such point pairs has been substantially reduced from those shown in FIG. 2B. Also, it will be noted that unlike in FIG. 2B wherein lines connecting possible correlating point pairs cross, there is no such line crossing in FIG. 2C. This corresponds to the physical constraint that bed boundaries do not cross.

Now that a graphical and intuitive understanding of the logging curve correlation methods of the present invention have been presented, reference will be made to FIGS. 3–5 wherein illustrative flow diagrams are depicted for implementation of the invention by means of a digital computer.

Figure 3:
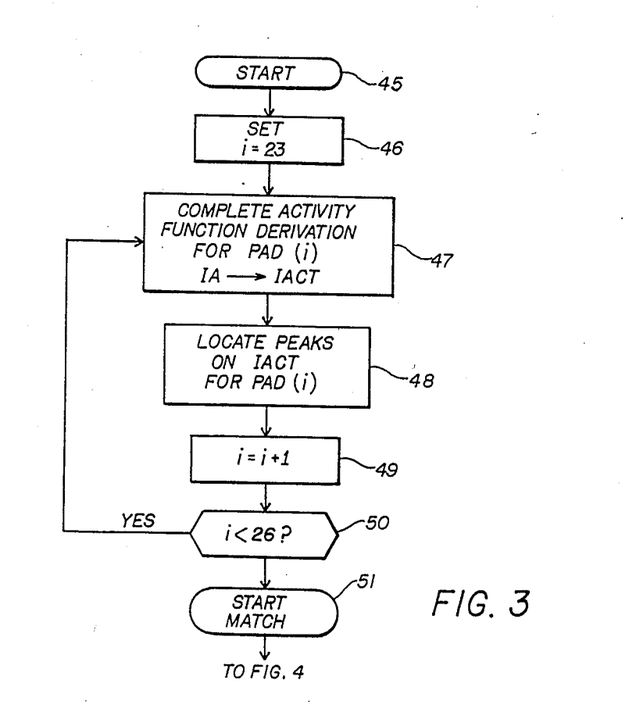
FIG. 3 illustrates the steps for producing activity transform functions depicted in FIGS. 2A-C for the dip meter system of FIG. 1.

Referring now to FIG. 3, there are illustrated the steps performed in accordance with the present invention in computing the activity transform functions such as 23B, 25B for the corresponding measurement curves 23A, 25A. Block 45 corresponds to the inputting of the formation measurement curve data derived from tool 17 into an appropriate buffer. Block 46 corresponds to designating the probe pad signal sequences for processing. As indicated in block 46 on the first sequence i is set to equal 23 corresponding to probe pad 23 signals. The next step in the process, as indicated in block 47 is to compute an activity transform function value for pad 23, i being equal to 23. The step is indicated by IA-→IACT, IACT representing the activity transform value such as X of FIG. 2A corresponding to pad 23 signal IA or point X.

Once all of the transform function values (shown as curve 23B of FIG. 2A, for example) are computed for a first probe pad measurement curve (such as curve 23A) the maximum values, or peaks, of the transform function are located, as shown in block 48. After locating the peaks on the activity transform the corresponding points of the logging curve itself at the same depth where the activity peaks occurred are designated (shown graphically by the crosses). The value of i is then increased by one as can be seen in block 49. The value of i is then checked to determine if it is less than 26 (block 50). If the value of i is less than 26 the transform function is computed for the next probe pad measurement curve. Once the value of i is equal to 26, this signifies that the transform values and maxima for the last pad 26 have been detected and the program shifts to the curve MATCH routine, indicated by block 51.

The purpose of the MATCH portion of the program is to match all possible crossed points on one log such as 23A with those on another curve such as 25A as shown in FIG. 2B for the various pad combinations, such as 1-2, 1-3, 1-4, 2-3, 2-4, and 3-4 and in accordance with certain criteria already discussed. The crossed points were derived from the steps of FIG. 3 just described. To correlate two curves characteristic features on one curve which relate to similar features on another curve must be determined. The basic feature of the curve is a simple slope. The curve character is determined by relative positions of the slopes separated by areas where the curve is relatively stable. Simply stated, in correlating two curves, first all possible single features are matched, then their relative positions are considered to find larger features that match on both curves and finally reverting to the single features to establish point-to-point correlations.

Figure 4:
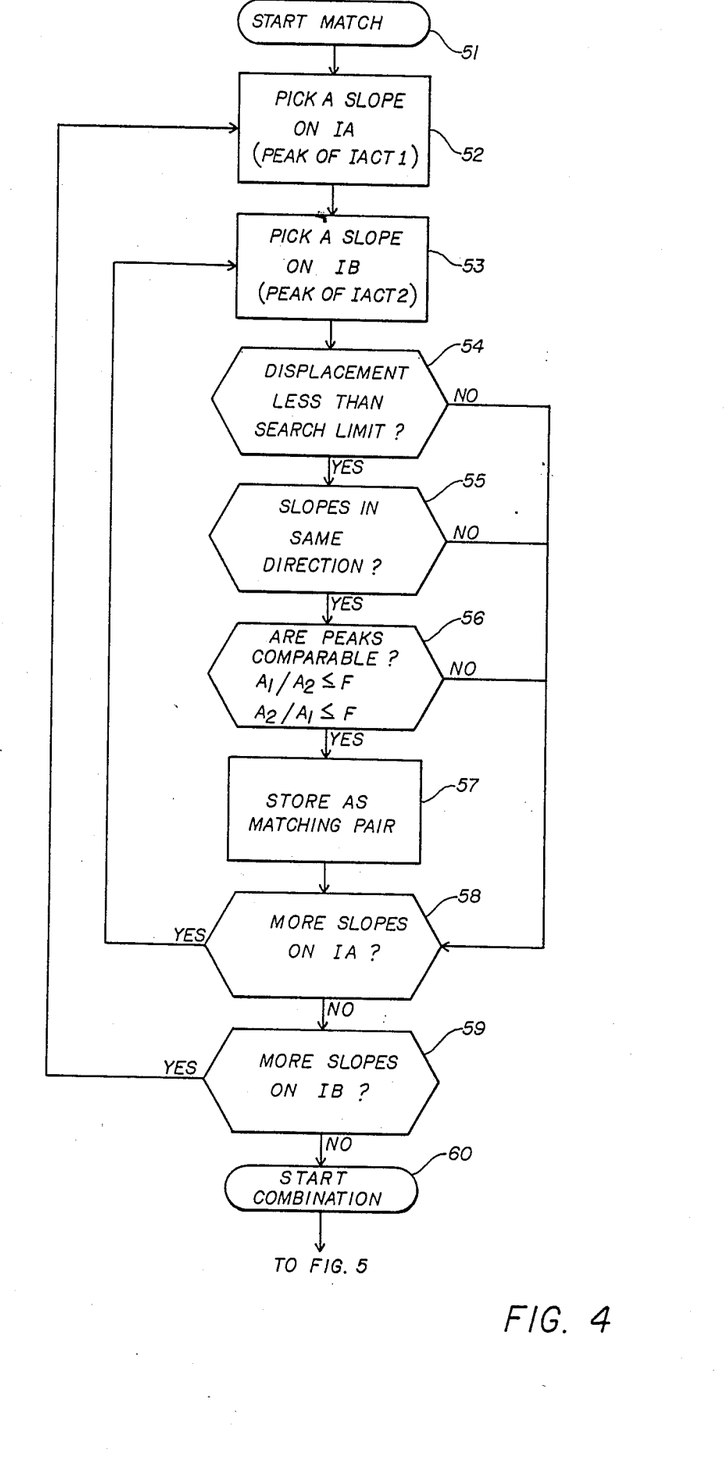
FIG. 4 illustrates the steps for determining the maximum possible matching pairs of similar features on curve pairs depicted in FIG. 2B.

Referring now to FIG. 4, the initial step in correlating a pair of probe pad measurement curves is indicated in block 52 and corresponds to selecting a peak on the activity transform formation of the first curve, IACT1, which may, for example, be curve 23B. Next as indicated in block 53 a peak is selected on the acivity transform function of the second curve, IACT2 which may be curve 25B. As will be recalled these peaks represent slopes on the corresponding probe pad measurement curves.

The criteria previously discussed are that two slopes match if they have comparable steepness and magnitude and they go in the same direction. Additionally, the two slopes must be separated by a distance less than the search limit. The search limit it will be recalled, is an external parameter defining the maximum possible displacement given the geological factors, such as borehole diameter and borehole deviation. The next step indicated in block 54 is to compare the peak of IACT1 with the peak of IACT2. If the depth displacement between IACT1 and IACT2 is less than the search limit the slopes are compared to determine if they are in the same direction, e.g., increasing or decreasing at a given depth, as indicated in block 55. To avoid small variations in direction in the curves introducing errors, direction is determined on an interval around a given point. The averaging interval corresponds to the window of the transform function. Thus, an average of the measurement values on the interval is found. The number of measurement values that are shallower than the depth being analyzed with values less than the mean, plus the number of measurement values that are deeper than the depth being analyzed with values greater than the mean, will represent the tendency of the curve to increase. The tendency of the curve to decrease is represented in the opposite manner. Comparing this information, a prevailing direction at any depth is obtained.

The next step as indicated in block 56 is a determination if the slopes are substantially comparable in "shape". As previously stated, this requirement translates into comparable steepness and magnitude. As previously noted, two shapes are comparable if their activities do not differ by more than factor predetermined by the general class of logs under consideration. Such a factor for dip meter determinations with microresisitivy logs has been found to be preferably four, for example.

Thus in block 56 the conditions $IACT1 \leq 4 \times IACT2$ (or for shorthand, $A_1/A_2 \leq F$) and $IACT2 \leq 4 \times IACT1$ (or for shorthand, $A_2/A_1 \leq F$) are checked. If the above conditions are met the correlation is registered and the data pairs are stored, as shown in block 57. The next step in block 58 is to check the curve IB for additional slopes. If additional slopes are present the program returns to block 53. Once all slopes on the second curve, IB, are located the first curve IA is checked for more slopes as shown in block 59. If additional slopes are present the program returns to block 52. Once all slopes on both curves are registered, the combination routine of FIG. 5 is entered wherein the actual optimal correlation point-pair selection is performed.

At the completion of FIG. 4, the universe of possibly correlating pairs have thus been selected. These pairs are depicted schematically in FIG. 2B as being interconnected with lines and were selected in accordance with the constraints of FIG. 4.

Figure 5:
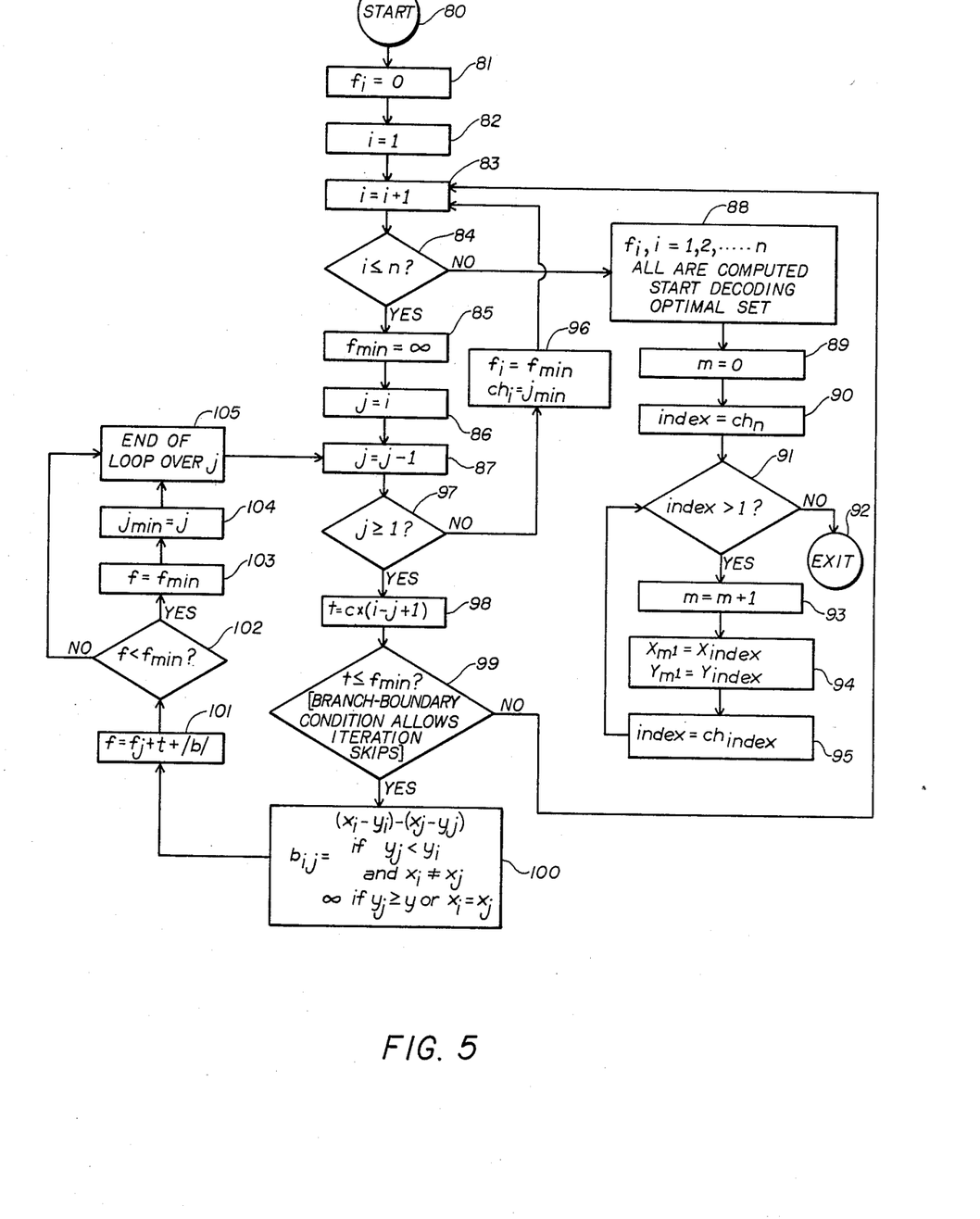
FIG. 5 illustrates the steps for selecting optimal correlation pairs of FIG. 2C from the maximum possible pairs of FIG. 2B.

The next step is to narrow down the choices to the actual selected correlated pairs shown for illustrative purposes in FIG. 2C in accordance with the method of FIG. 5. In order to clearly explain the method, first a general description thereof will be made followed by reference in more detail to the flow diagram of FIG. 5 implementing the method. In passing, it will be noted that the methods of the present invention of selecting possibly correlating pairs of FIG. 2B and then the actual pairs of FIG. 2C may be implemented in a number of ways by one of ordinary skill in the art. Thus, the invention is not intended to be limited in any way to any one manner such as the specific algorithm depicted in the flow diagrams of FIGS. 3–5.

The method or model of selecting from the possible point pair matches of FIG. 2B those optimally correlated pairs of FIG. 2C employs a technique known as spring loaded template matching as more particularly described in "The Representation And Matching Of Pictorial Structures" by Fischler and Elschlager, *IEEE Transactions on Computers*, Volume C-22, January 1973, pages 67–92, which is incorporated herein by reference for all purposes.

The technique can best be understood by imagining each of the crossed points of curve 23a of FIG. 2B being interconnected by a spring to an adjacent point and, in like manner, each crossed point of curve 25a also being interconnected by a spring to the adjacent point.

If the curves 23a and 25a are identical in shape but simply offset or shifted vertically in depth, one could be superimposed on the other. However, for reasons previously described such as the physical differences in each pad measurement system and slight differences in measured parameters of the formation diametrically opposed across the borehole (however small the borehole diameter), exact matching is not to be expected. This gives rise to the problem at hand, namely how to select the best matchup or correlation shown in FIG. 2C between crossed points on the curves 23a and 25a of FIG. 2B.

If, as just described, there is not exact correlation between the curves, i.e., there is deformation in one shape relative to the other, it can further be imagined that the best matchup might occur in which the total tension in the springs interconnecting the crossed points finally selected are minimized. This, in fact, is the technique or assumption used in the algorithm which follows, namely that of minimizing the total spring tension. Thus, the total tension in all springs interconnecting the particular selection of crossed points shown in curves 23a and 25a of FIG. 2C will be smaller than in any other of the possible collection of points which may have otherwise been selected from the curves 23a and 25a of FIG. 2B.

Spring tension is a linear function of the difference between the initial and final length of the spring. Putting this in terms of the two possible point pairs of curves 23a and 25a of FIG. 2B, this translates to the tension of these springs interconnecting these points being proportional to the depth difference between two adjacent points on curve 25a and the depth difference between two corresponding adjacent points on curve 23a. Mathematically, this may be expressed as follows:

$$\Delta_b = (Y_2 - Y_1) - (X_2 - X_1), \qquad \text{Equation 5}$$

where $Y_1$ and $Y_2$ are depths of two adjacent points on curve 25a;

$X_1$ and $X_2$ are depths of corresponding points on curve 23a;

$Y_1, X_1$, and $Y_2, X_2$ are the two matched point pairs, each point pair being comprised of a point from curve 25a and 23a; and $\Delta b$ is a "break" or difference between two adjacent displacements or correlations, or a measure of the spring tension.

From the foregoing, it will further be apparent that the total spring tension will be the summation of the spring tension for all adjacent points on the curves, and this total tension can be expressed mathematically as:

$$T = \sum_i |\Delta b_i| \qquad \text{Equation 6}$$

Also from the foregoing discussion regarding minimization of spring tension, it should intuitively be understood that the foregoing total tension or distortion (e.g., difference between two adjacent displacements) should be minimized which can be expressed mathematically by the following formula:

$$\sum_i |b_i| \to \min \qquad \text{Equation 7}$$

Also based upon the previous discussion, it will be recalled that not all of the crossed points on curve 23a will have a corresponding matched point on curve 25a and vice-versa due to errors in measurement signals, and the like. In other words, some events or features on one well log may not be repeated on the other log whereas others will correlate. Thus some of the crossed points on the curves will not be found to be included in the final optimally correlated sets of point pairs.

On the other hand, although all of the crossed points of FIG. 2B cannot be included, it is desirable to find the largest possible number of correlations and thus avoid eliminating too many crossed points simply because the number of correlations found is indicative of the degree of curve similarity. In other words, if too many points are omitted, no correlations result. Thus, to minimize the number of crossed points which must be excluded this may be expressed mathematically by modifying the preceeding equation 6 as follows:

$$\sum_i |\Delta b_i| + c \times s \to \min \qquad \text{Equation 8}$$

where s is the number of excluded crossed points; and c is a coefficient corresponding to tension of the springs and is selected empirically by experimentation to fit the intuitive value employed in manual correlation methods which has been found to lie somewhere in the range of 2 to 4.

It will be noted that this coefficient is actually a number which penalizes or "fines" the Equation 8 for excluding a possible crossed pair.

The immediately preceeding Equation 8, due to the extensive number of crossed points involved immediately suggests use of a modern digital computer and efficient programming techniques for its solution. More particularly, it has been found that realistic solutions may be found in a reasonable time constraint by using dynamic programming to select the optimal correlation pairs, such dynamic programming techniques being well known in the art. Thus, intermediate minimum values, $f_1$ are computed according to the following formulas:

$$f_1 = 0 \qquad \text{Equation 9}$$

$$f_i \min_j [f_j + c \times (i - j - 1) + \Delta b_{ij}]$$

for $i = 2, 3, \ldots, n$
$j = 1, 2, 3, \ldots, i - 1$ where n is the number of possible point-to-point correlations;

c is a coefficient from criterion (6);

$b_{ij}$ is a "break" between the two correlations of $(x_i, y_i)$ and $(x_j, y_j)$; and $$b_{ij} = \begin{bmatrix} (x_i - y_i) - (x_j - y_j), \\ \text{if } y_j < y_i \text{ and } x_i \neq x_j, \text{ and} \\ \infty, \text{ if } y_j \geq y_i \text{ or } x_i = x_j \end{bmatrix} \qquad \text{Equation 10}$$

The final solution can then be decoded by using the computer values of $f_i$ as follows:

Indices $p_k$ are determined as, $$p_1 = ch_n \qquad \text{Equation 11}$$

$$p_{k+1} = ch_{p_k}$$

where $ch_i$ is the value of the index j for which the minimum in Equation 9 was obtained.

The set of optimal correlations of FIG. 2C is given by the pairs:

$(x_{p1}, y_{p1}), (x_{p2}, y_{p2}), \ldots, (x_{pm}, y_{pm})$, where m is the number of different p's obtained from Equations 10.

As previously indicated, the final curve-to-curve optimal correlations resulting from the foregoing dynamic programming solution are indicated schematically in FIG. 2C. Comparison to the crossed points of FIG. 2B clearly indicate that crossing correlations have been eliminated based upon the "if" conditions in the $b_{ij}$ Equation 10, and the most consistent correlations have thus been derived from Equation 8. In passing it will be noted that as the spring tension becomes greater, the force required to match points becomes larger and this increases the number of points that will therefore be excluded from the final correlation selection or set. Representative description in more detail of dynamic programming techniques may be found in "Sequential Optimization in Pattern Recognition and Picture Description" in the proceedings of the IFIP Congress, Amsterdam, The Netherlands, by Kovalewsky, 1971, and "On the Optimal Detection of Curves and Picture Processing", *Communications of the ACM*, Volume 14, May 1971, pages 335-345, by Montanari, which are incorporated herein by reference.

Before discussing the flow diagram of FIG. 5 which implements the foregoing constraints, a word must be mentioned about the processing interval for performing the correlation. In the prior art the processing interval term was normally used to refer to the correlation interval, often called a window length, whereby one curve was shifted in its entirety with respect to the other. However, as the term is used herein, displacements of the processing interval will vary with depth and although in the present usage the processing interval in general is the entire length of the log it can, however, be broken into smaller intervals.

If one of the two curves 23a and 25a exhibit no meaningful variation for a given interval, the interval length being greater than the maximum possible displacement, then no correlation can be found to traverse this interval. This, in turn, means that two logging curve sections are naturally separated and can be correlated independently since no point on the logging curve above this interval can be correlated to a point below it and conversely.

Mathematically, this "separation" condition can be expressed by the following formula:

$$A(d) \leq nl \qquad \text{Equation 12}$$

for all d's on the depth interval $(d_1, d_2)$ and, $$|d_1 - d_2| > md$$

where $A(d)$ is activity, expressed by Equation (4);
nl is noise level, selected above; and
md is the maximum displacement.

The foregoing equation expresses mathematically this "separation" condition in numerical form which can also be easily programmed for a digital computer. With the correct choice of the noise level, the equation thus allows the total length of the log to be separated into correlation intervals which are small enough for the data to conveniently fit into computer memory.

Turning now to FIG. 5, this Figure represents a typical flow diagram of the foregoing selection process just described whereby the optimally correlated pair points are selected from the possible pair points selected by implementing the flow diagram of FIG. 4. The diagram is suitable for implementation by digital computer in a manner known in the art.

Although the diagram is self-explanatory and readily implemented, a few points shall be noted in more detail. First, two additional points have been added to the set n of all possible feasible matches from FIG. 4, namely $(-\infty, 0)$ and $(+\infty, 0)$ as indicated, for example, at block 85. The reason for this is to permit skipping any number of points in the beginning and end of the correlation chain, with the first and last correlating points thus being infinitely far to the left and right, respectively. So that the two points do not add to the value of Equation 8, n is appropriately increased by 2.

It will be appreciated from block 100 that this definition of a "break", e.g., $b_{ij}$, physically means that displacement crossings are not permitted and assumes that all possible pairs $x_i$, $y_i$ have been sorted in ascending order by the points $x_i$ on the curve such as curve 23a. Also, in blocks 95 and 96, it will be noted that $ch_i$ or $ch_{index}$ is the value of j for which the minimum of Equation 9 and block 103 have been determined.

At the end of all iterations of FIG. 5, $ch_n$ will refer to the last selected optimal correlation. If m is the number of different p's obtained from Equation 11, then the desired optimal correlations out of all possible correlations $x_i$, $y_i$ will be $(x_{p1}, y_{p1}), (x_{p2}, y_{p2}), \ldots, (x_{pm}, y_{pm})$ in ascending order by x, as previously noted.

It is therefore apparent that the present invention is one well adapted to obtain all of the advantages and features hereinabove set forth, together with other advantages which will become obvious and apparent from a description of the apparatus itself. It will be understood that certain combinations and subcombinations are of utility and may be employed without reference to other features and subcombinations. Moreover, the foregoing disclosure and description of the invention is only illustrative and explanatory thereof, and the invention admits of various changes in the size, shape and material composition of its components, as well as in the details of the illustrated construction, without departing from the scope and spirit thereof.

The embodiments of the invention in which an exclusive property or privilege is claimed is defined as follows:

1. A method for depth correlating a plurality of well logging measurements each comprised of data taken at a plurality of depths within at least one borehole, said method comprising the steps of:
   deriving a first activity function from a first of said measurements;
   selecting first data points from said first measurement corresponding in depth to maxima of said first activity function, each of said first data points having magnitudes greater than a preselected first noise level;
   deriving a second activity function from a second of said measurements;
   selecting second data points from said second measurement corresponding in depth to maxima of said second activity function, each of said second data points having magnitudes greater than a preselected second noise level; and
   comparing said first and said second data points.

2. The method of claim 1, wherein said comparing step includes:
   selecting a first one of said first data points derived at a first borehole depth and lying on a corresponding first segment of said first measurement; and
   selecting a first plurality of data points from said second data points derived within a preselected increment of borehole depth from said first borehole depth, each said data point of said first plurality lying on a corresponding second segment of said first measurement.

3. The method of claim 2, wherein said comparing step further includes:
   determining the sign of the slope of said first segments of said first and second meaurements, respectively.

4. The method of claim 3, wherein said comparing step further includes:
   determining the shape of said first segments of said first and second measurements, said shape of said first segment of said first measurement being defined by said first activity function; and
   each said shape of said first segments of said second measurement being defined by said second activity function.

5. The method of claim 4, wherein said comparing step further includes:
   comparing said slope sign and shape of said first segment of said first measurement to said slope sign and shape of each said first segment of said second measurement;
   selecting line segments from said first segments of said second measurement each having a slope sign and shape of said first line segment of said first measurement; and matching said first one of said first data points with each data point corresponding to each of said selected line segments.

6. The method of claim 5, wherein said comparing step includes:
selecting a second one of said first data points at a second borehole depth and lying on a corresponding second segment of said first measurement; and
selecting a second plurality of data points from said second data points within a second preselected increment of borehole depth from said borehole depth, each said data point of said second plurality lying on a corresponding second segment of said second measurement.

7. The method of claim 6, wherein said comparing step includes:
determining the sign of the shape of said second segments of said first and said second measurements, respectively.

8. The method of claim 7, wherein said comparing step further includes:
determining the shape of said second segments of said first and second measurements, said shape of said second segments of said first measurement being defined by said first activity function, and each said shape of said second segments of said second measurement being defined by said second activity function.

9. The method of claim 8, wherein said comparing step further includes:
comparing said slope sign and shape of said second segment of said first measurement to said slope sign and shape of each of said second segments of said second measurement;
selecting second line segments from said second segments of said second measurement, each having a slope sign and shape of said second line segment equal to said slope sign and shape of said second segment of said first measurement; and
matching said second one of said first data points with each data point corresponding to each of said selected second line segments.

10. The method of claim 9, wherein said first and second borehole increments are equal in magnitude.

11. The method of claim 10, wherein said first and said second measurements comprise measurements of resistivity of a formation traversed by the same borehole.

12. The method of claim 10, wherein
said first measurement is derived from a first one of said at least one boreholes; and
said second measurement is derived from a second one of said at least one boreholes.

13. The method of claim 10, further including repeating the steps of claims 1-10 for each of said first data points until each of said first data point is matched with at least one said second data point, wherein said matching of said each first data point and said at least one second data point is spring-loaded template matching.

14. The method of claim 5, wherein said preselected increment of borehole depth corresponds to formation dip adjacent said first borehole depth.

15. The method of claim 5, wherein said first and said second noise levels are variable as a function of said first and second measurements, respectively.

16. Apparatus for depth correlating a plurality of well logging measurements each comprised of data taken at a plurality of depths within a borehole, comprising:
means for deriving a first of said well logging measurements;
means for deriving a second of said well logging measurements;
means for converting said first and said second well logging measurements into respective first and second activity functions;
means for detecting maxima of said first and said second functions above preselected respective first and second noise levels;
means for associating each said detected maxima of said first activity function with a corresponding data point of said first well logging measurement;
means for associating each said detected maxima of said second activity function with a corresponding data point of said second well logging measurement; and
means for comparing each of said corresponding data points of said first well logging measurement with each of said corresponding data points of said second well logging measurement.

17. The apparatus of claim 16, wherein said comparison means includes:
means for selecting a plurality of data points from said second well logging measurements derived within a preselected increment of borehole depth from a selected one data point from said first well logging meaurement, each of said selected one data points of said first well logging measurement and each of said plurality of data points from said second well logging measurement lying on a respective segment of said first and second well logging measurements, respectively.

18. The apparatus of claim 17, wherein said comparison means further includes means for determining the sign of the slope and shape of each of said segments.

19. The apparatus of claim 18, wherein said comparison means further includes means for selecting for each said segment of said first well logging measurements corresponding segments of said second well logging measurements each having a slope, sign and shape identical to that of said each segment of said first well logging measurement.

20. The apparatus of claim 19, wherein said comparison means includes:
means for spring loaded template matching of each of said data points associated with said selected segments of said first well logging measurement with a different one of said data points associated with said selected segments of said second well logging measurement.

* * * * *